US008464215B2

(12) United States Patent
Tsai et al.

(10) Patent No.: US 8,464,215 B2
(45) Date of Patent: Jun. 11, 2013

(54) EMBEDDED ELECTRONIC DEVICE AND METHOD OF IMPLEMENTING USER INTERFACE THEREIN

(75) Inventors: Teng-Yu Tsai, Taipei Hsien (TW); Jyh-Gwo Ju, Taipei Hsien (TW); Chia-Peng Wang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 823 days.

(21) Appl. No.: 12/609,208

(22) Filed: Oct. 30, 2009

(65) Prior Publication Data
US 2011/0016383 A1 Jan. 20, 2011

(51) Int. Cl.
G06F 9/44 (2006.01)
G06F 15/177 (2006.01)
G06F 3/048 (2006.01)

(52) U.S. Cl.
USPC ............ 717/109; 717/121; 715/763; 715/858

(58) Field of Classification Search
None
See application file for complete search history.

(56) References Cited

U.S. PATENT DOCUMENTS

| | | | | | |
|---|---|---|---|---|---|
| 5,475,851 | A | * | 12/1995 | Kodosky et al. | 715/763 |
| 5,497,500 | A | * | 3/1996 | Rogers et al. | 717/109 |
| 5,821,934 | A | * | 10/1998 | Kodosky et al. | 715/763 |
| 7,493,592 | B2 | * | 2/2009 | Karatal et al. | 717/121 |
| 7,725,817 | B2 | * | 5/2010 | Krasun et al. | 717/143 |
| 7,861,179 | B2 | * | 12/2010 | Reed | 715/763 |
| 8,176,466 | B2 | * | 5/2012 | Tristram | 717/113 |
| 8,312,422 | B2 | * | 11/2012 | Karatal et al. | 717/109 |
| 2003/0064757 | A1 | * | 4/2003 | Yamadera et al. | 455/566 |
| 2003/0081011 | A1 | * | 5/2003 | Sheldon et al. | 345/838 |
| 2006/0107237 | A1 | * | 5/2006 | Kim | 715/858 |
| 2007/0113222 | A1 | * | 5/2007 | Dignum et al. | 717/143 |
| 2007/0220438 | A1 | * | 9/2007 | Okamoto et al. | 715/763 |
| 2009/0174668 | A1 | * | 7/2009 | Cho | 715/763 |
| 2010/0017438 | A1 | * | 1/2010 | Haartsen et al. | 707/104.1 |
| 2010/0275139 | A1 | * | 10/2010 | Hammack et al. | 715/763 |

OTHER PUBLICATIONS

Jason L. Hill and David E. Culler; MICA: A Wireless Platform for Deeply Embedded Networks; IEEE 2002; Retrieved online on Apr. 12, 2013; pp. 12-24; Retrieved from the Internet: <URL: http://www.cs.berkeley.edu/~culler/AIIT/papers/platforms/micaarch.pdf>.*

David Joshua Kurlander; Graphical Editting by Example; 1993; Retrieved online on Apr. 12, 2013; pp. 1-234; Retrieved from the Internet: <URL: http://delivery.acm.org/10.1145/200000/194118/thesis.pdf?>.*

Assem A. M. Bsoul et al.; Implementation of an FPGA-Based Low-Power Video Processing Module for a Head-Mounted Display System; IEEE 2013; pp. 214-217; Retrieved from the Internet: <URL: http://ieeexplore.ieee.org/stamp/stamp.jsp?tp=&arnumber=6486864>.*

* cited by examiner

Primary Examiner — Thuy Dao
Assistant Examiner — Hanh T Bui
(74) Attorney, Agent, or Firm — Altis Law Group, Inc.

(57) ABSTRACT

An embedded electronic device includes a display and a user interface system shown on the display. The user interface system includes a plurality of item display modules and item resource modules. Each item display module includes a position sub-module operable to position the item resource module, and a connection sub-module capable of linking to the item resource module. Each item resource module has at least one resource path sub-module to retrieve a resource.

2 Claims, 5 Drawing Sheets

EMBEDDED ELECTRONIC DEVICE AND METHOD OF IMPLEMENTING USER INTERFACE THEREIN

BACKGROUND

1. Technical Field

The present disclosure relates to interfaces, and particularly to a method of implementing a user interface for an embedded electronic device.

2. Description of Related Art

Embedded devices, such as digital photo frames (DPFs) are becoming increasingly popular due to their convenience and ease of implementing particular functions. However, it is desirable to modularize function items for the user interface of the embedded device.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
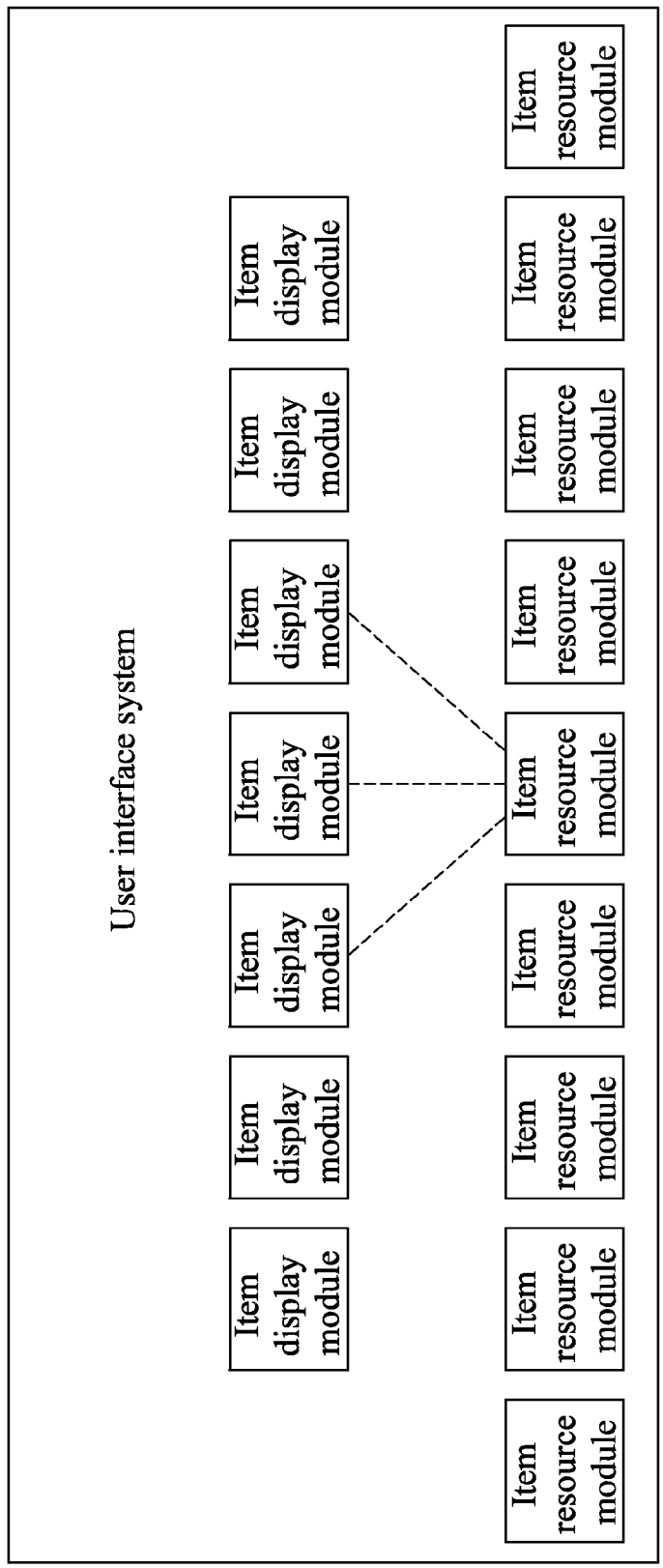
FIG. 1 is a block view of an embedded electronic device.

Referring to FIG. 1, an embedded electronic device includes a user interface system and a display showing the user interface system. The user interface system includes a plurality of item display modules and item resource modules. Each item display module is set in a fixed position corresponding to an item resource module. Each item resource module can be displayed on any of the item display modules.

Figure 2:
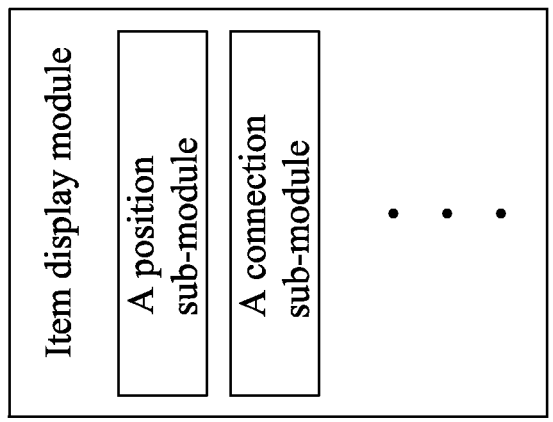
FIG. 2 is a block view of an item display module.

Referring to FIG. 2, each item display module includes a position sub-module and a connection sub-module. The position sub-module locates the item resource module on the display. The connection sub-module connects to the item resource module.

Figure 3:
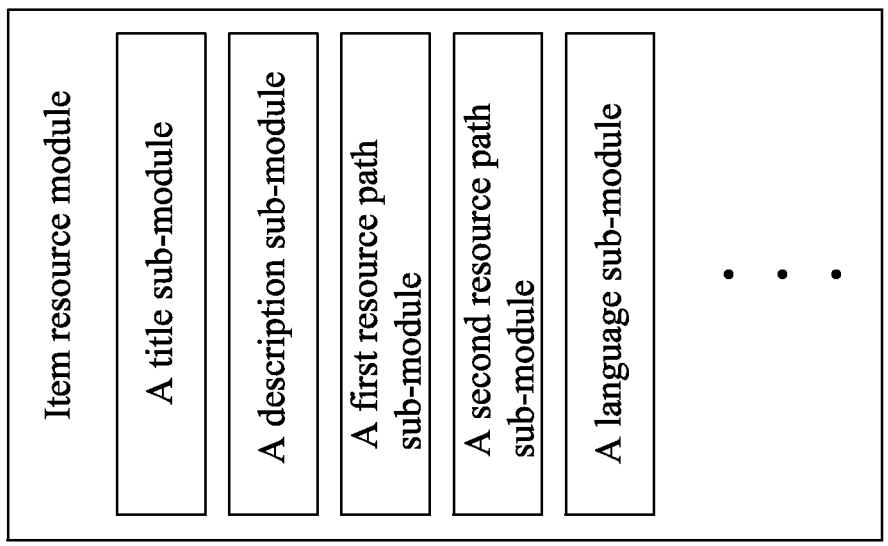
FIG. 3 is a block view of an item resource module.

Referring to FIG. 3, each item resource module includes a title sub-module, a description sub-module, a first resource path sub-module, a second resource path sub-module, and a language sub-module. The title sub-module defines a title of the item resource module. The description sub-module describes function of the item resource module. The first resource path sub-module connects to a first resource (for example, a small picture). The second resource path sub-module connects to a second resource (for example, a large picture). The language sub-module can configure different languages.

A resource may be a image or text.

Figure 4:
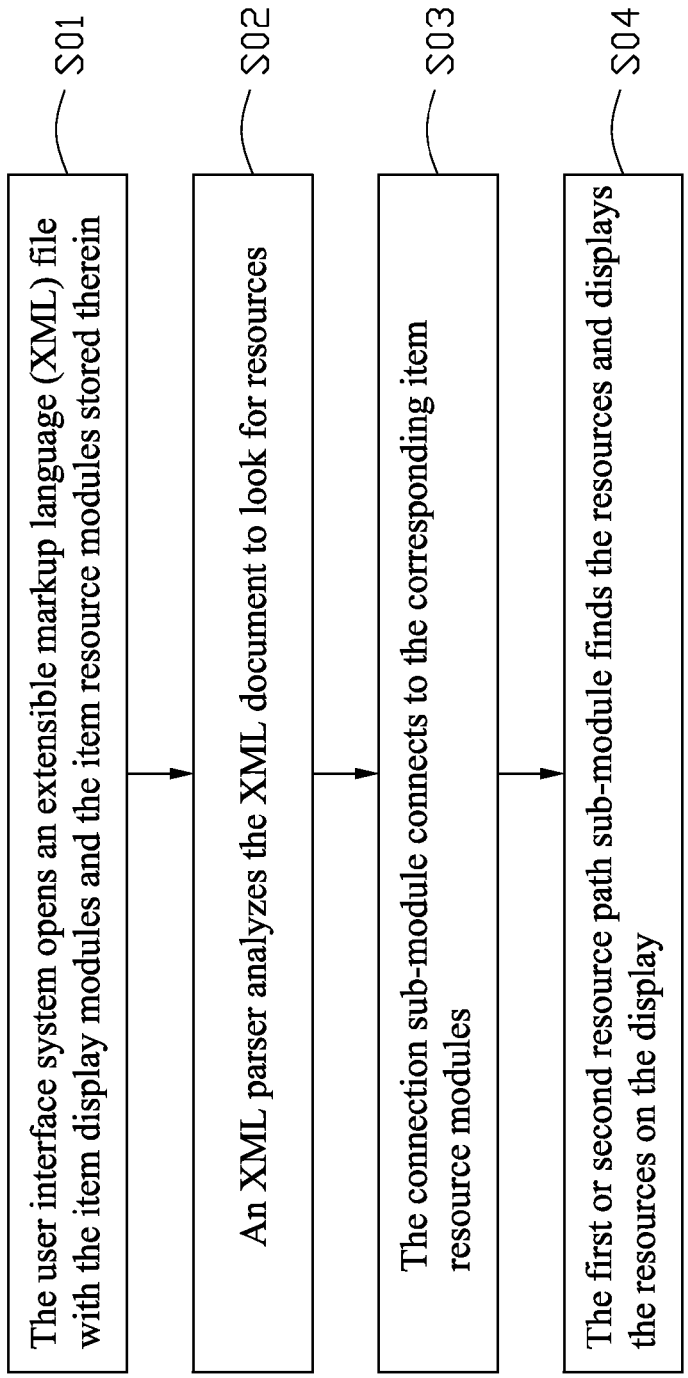
FIG. 4 is a flowchart of generation of a user interface of an embedded electronic device.

FIG. 4 of generation of a user interface of an embedded electronic device. Depending on the embodiment, additional blocks in the flow of FIG. 4 may be added, others removed, and the ordering of the blocks may be changed.

In block S01, an extensible markup language (XML) file with the item display modules and the item resource modules stored therein is opened.

In block S02, an XML parser analyzes the XML document to locate corresponding resources.

In block S03, the connection sub-module connects to the corresponding item resource modules.

In block S04, the first or second resource path sub-module locates the resources and displays the located resources on the display.

Figure 5:
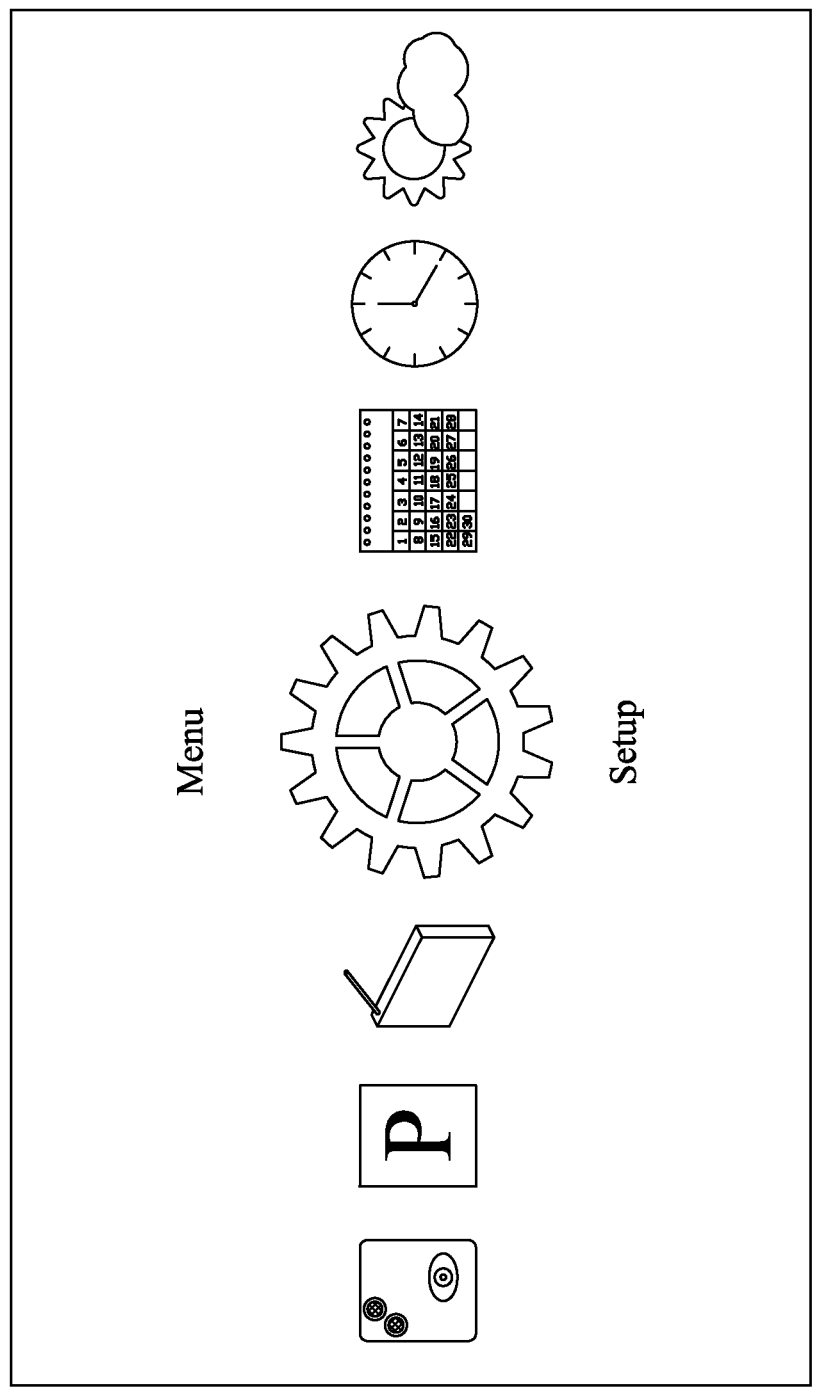
FIG. 5 is a schematic view of an embedded electronic device.

FIG. 5 is a schematic view of the display in the embedded electronic device. The user interface system includes a plurality of item resource modules, such as setup module, calendar module, clock module, and weather module. Each item resource module is linked to the item display module. When a directional control is activated, a corresponding module is centered on the display. The second resource path sub-module locates a large image of the calendar for display. When the module is selected, the user interface system implements the corresponding service.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A method of implementing a user interface in an embedded electronic device, comprising:

displaying a user interface system on a display of the embedded electronic device, the user interface system comprising a plurality of item display modules and a plurality of item resource modules, each of the plurality of item resource modules comprising a first resource path sub-module configured to retrieve a first source and a second resource path sub-module configured to retrieve a second source;

linking each of the plurality of item display modules to one of the plurality of item resource modules;

retrieving the first resource and the second source by each of the plurality of item display modules; and when one of the plurality of item display modules is selected, positioning the linked item resource module of the selected item display module in the center of the display by the selected item display module;

when an item resource module of the plurality of item resource modules is positioned in the center of the display, displaying the first resource by the item resource module; and when the item resource module is not positioned in the center of the display, displaying the second resource by the item resource module.

2. An embedded electronic device, comprising:

a display; and a user interface system shown on the display, the user interface system comprising:

a plurality of item resource modules, each of the plurality of item resource modules comprising at least one resource path sub-module, each of the at least one resource path sub-module comprising a first resource path sub-module configured to retrieve a first source and a second resource path sub-module configured to retrieve a second source; and a plurality of item display modules, each of the plurality of item display modules comprising a connection sub-module linked to one of the plurality of item resource modules, and a position sub-module configured to position the linked item resource module in various positions on the display;

wherein when one of the plurality of item display modules is selected, the position sub-module of the selected item display module is configured to position the linked item resource module of the selected item display module in the center of the display;

when an item resource module of the plurality of item resource modules is positioned in the center of the display, the item resource module is configured to display the first resource; when the item resource module is not positioned in the center of the display, the item resource module is configured to display the second resource.

\* \* \* \* \*